United States Patent [19]

Keogh

[11] Patent Number: 5,132,350

[45] Date of Patent: Jul. 21, 1992

[54] FLAME RETARDANT COMPOSITIONS

[75] Inventor: Michael J. Keogh, Bridgewater, N.J.

[73] Assignee: Union Carbide Chemicals & Plastics Technology Corporation, Danbury, Conn.

[21] Appl. No.: 552,124

[22] Filed: Jul. 13, 1990

[51] Int. Cl.$^5$ .............................................. C08K 3/22
[52] U.S. Cl. ..................... 524/267; 524/506; 524/436; 523/173; 428/463
[58] Field of Search ............... 524/265, 436, 506, 267; 428/463; 523/173

[56] References Cited

U.S. PATENT DOCUMENTS

| | | | |
|---|---|---|---|
| 3,491,137 | 1/1970 | Zaweski et al. | 524/265 |
| 4,098,762 | 7/1978 | Miyata et al. | 260/45.7 R |
| 4,265,801 | 5/1981 | Moody et al. | 524/506 |
| 4,301,056 | 11/1981 | Patze et al. | 524/265 |
| 4,387,176 | 6/1983 | Frye | 524/506 |
| 4,724,248 | 2/1988 | Dexter et al. | 524/265 |
| 4,885,328 | 12/1989 | Danforth et al. | 524/436 |
| 5,002,996 | 3/1991 | Okuda et al. | 524/436 |
| 5,025,042 | 6/1991 | Yoshida et al. | 524/436 |

FOREIGN PATENT DOCUMENTS

| | | | |
|---|---|---|---|
| 48909 | 9/1989 | European Pat. Off. | 524/436 |
| 2011746 | 1/1987 | Japan | 524/436 |
| 1-115944 | 5/1989 | Japan | 524/436 |

Primary Examiner—Kriellion S. Morgan
Attorney, Agent, or Firm—Saul R. Bresch

[57] ABSTRACT

A composition useful in the manufacture of cable comprising:
(i) a copolymer comprised of ethylene and vinyl acetate;
(ii) a surface treated magnesium hydroxide having (a) a strain in the <101> direction of not more than $3.0 \times 10^{-3}$; (b) a crystallite size in the <101> direction of more than 800 angstroms; and (c) a surface area, determined by the BET method, of less than 20 square meters per gram; and
(iii) a silicone fluid.

12 Claims, No Drawings

FLAME RETARDANT COMPOSITIONS

TECHNICAL FIELD

This invention relates to flame retardant compositions containing an ethylene copolymer and a magnesium hydroxide filler. The compositions are particularly useful in plenum cable.

BACKGROUND ART

Plenum cable is used to carry power through ducts which are used to ventilate, for example, high-rise buildings. While a fire occurring in these ducts can be dangerous in its own right, such a conflagration is especially insidious because the smoke and other gases resulting from the fire are transported through the ducts throughout the building, even to parts quite remote from the blaze. In some cases, colorless and odorless gases can invade sleeping quarters housing unsuspecting people.

The cable used in plenums is generally constructed of metal conductors insulated with a polymeric material. These elements are generally twisted to form a core and are protected by another Polymeric sheath or jacket material. In certain cases, added protection is afforded by inserting a wrap between the core and the sheath.

To mitigate the dangers of a duct fire, it is important that the cable jacketing is not only flame retardant, but, on burning, produces a minimum amount of smoke, emits low levels of corrosive gases and is self-extinguishing. Further, the cable should not raise installation problems caused by materials, which are toxic to the touch.

Ethylene polymers are considered to be deficient insofar as flame retardance or flame resistance is concerned. One method for increasing flame resistance in these polymers is to formulate using metal hydroxides as the flame retardant additive. Both aluminum hydroxide and magnesium hydroxide have been used in this way. Generally, these hydroxides are viewed as equivalents as flame retardants in this context. Aluminum hydroxide is preferred on a cost/performance basis, however. Thus, more than ninety-five percent of all hydrate based commercial formulations use aluminum hydroxide.

In spite of the cost advantage of aluminum hydroxide, there is a strong thrust towards improving the flame resistance of plenum cable as well as its smoke, corrosion, self-extinguishing, and toxic characteristics because of the vulnerability of the occupants of buildings containing plenums through which air is transported for heating and cooling.

DISCLOSURE OF INVENTION

An object of this invention, therefore, is to provide a composition based on a polymer of ethylene, which can be used as jacketing for plenum cable and will furnish the plenum cable with superior flame retardance or resistance, low smoke and corrosive gases emissions, a self-extinguishing characteristic, and essentially no handling toxicity.

Other objects and advantages will become apparent hereinafter.

According to the invention, a composition has been discovered, which meets the above objective. The composition comprises:

(i) a copolymer comprised of ethylene and vinyl acetate;

(ii) magnesium hydroxide having (a) a strain in the $<101>$ direction of no more than $3.0 \times 10^{-3}$; (b) a crystallite size in the $<101>$ direction of more than 800 angstroms; and (c) a surface area, determined by the BET method, of less than 20 square meters per gram, said magnesium hydroxide having been surface treated with one or more carboxylic acids having 8 to 24 carbon atoms or the metal salts thereof; and (iii) a silicone fluid.

DETAILED DESCRIPTION

Copolymers comprised of ethylene and vinyl acetate are well known and can be prepared by conventional techniques. The portion of the copolymer attributed to the vinyl acetate monomer can be in the range of about 12 to about 60 parts by weight based on 100 parts by weight of the copolymer and is preferably in the range of about 25 to about 52 parts by weight.

The magnesium hydroxide defined above and a method for its preparation are disclosed in U.S. Pat. No. 4,098,762 issued on Jul. 4, 1978. A preferred characteristic of the magnesium hydroxide is that the surface area, as determined by the BET method, is less than 10 square meters per gram.

The amount of magnesium hydroxide used in the composition is in the range of about 50 to about 350 parts by weight of magnesium hydroxide per one hundred parts by weight of ethylene/vinyl acetate copolymer and is preferably in the range of about 75 to about 250 parts by weight of magnesium hydroxide per one hundred parts by weight of ethylene/vinyl acetate copolymer.

The magnesium hydroxide is preferably surface treated with a saturated or unsaturated carboxylic acid having 8 to 24 carbon atoms and preferably 12 to 18 carbon atoms or a metal salt thereof. Mixtures of these acid and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts by weight of acid and/or salt per one hundred parts by weight of magnesium hydroxide and preferably about 0.25 to about 3 parts by weight per one hundred parts by weight of magnesium hydroxide. The acid or salt can be merely added to the composition in like amounts rather than using the surface treatment procedure, but this is not preferred.

Component (iii) is a silicone fluid. Silicone fluids are organosiloxane polymers commercially available in a range of viscosities from 0.65 to about 1,000,000 centistokes. Viscosities in the range of about 1000 to about 1,000,000 centistokes are useful in subject composition and those in the range of about 10,000 to about 1,000,000 centistokes are preferred. The silicone fluids can be saturated or unsaturated. The unsaturated silicone fluids, of particular interest, are those having one or more ethylenically unsaturated groups, e.g., those which are vinyl substituted. These silicone fluids can contain about 1 to about 10 percent by weight ethylenically unsaturated groups and preferably contain about 2.5 to about 7 percent by weight ethylenically unsaturated groups.

One embodiment of a silicone fluid can be represented by the following formula:

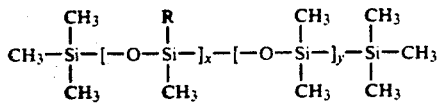

wherein R can be CH$_2$=CH— or CH$_3$— and x plus y can be equal to 1 to 5000. The silicone fluids are preferably characterized by their viscosity, however.

The amount of silicone fluid which can be used in subject composition is in the range of about 0.1 to about 10 parts by weight of silicone fluid per one hundred parts by weight of polymer and is preferably in the range of about 1 to about 5 parts by weight per one hundred parts by weight of polymer.

Other useful additives for the plenum cable composition are coupling agents, surfactants, free radical generators, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants. Some of the more important additives are discussed below.

A coupling agent is a chemical compound, which chemically binds polymer components to inorganic components. This is effected by a chemical reaction taking place at the temperatures under which the formulation is compounded, about 70° C. to about 180° C. The coupling agent generally contains an organofunctional ligand at one end of its structure which interacts with the backbone of the polymeric component and a ligand at the other end of the structure of the coupling compound which attaches through reaction with the surface of the filler. The following silane coupling agents are useful in subject composition: gamma-methacryloxypropyltrimethoxy silane; methyltriethoxy silane; methyltris (2-methoxyethoxy) silane; dimethyldiethoxy silane; vinyltris(2-methoxyethoxy) silane; vinyltrimethoxy silane; and vinyltriethoxy silane; and mixtures of the foregoing. A preferred silane coupling agent is a mixture of gamma-methacryloxypropyltrimethoxy silane and vinyltriethoxysilane. This mixture is described in U.S. Pat. No. 4,481,322.

Useful reinforcing additives include polymerizable unsaturated organic compounds having at least two polymerizable unsaturated groups. It is believed that the reinforcing additive reacts chemically with the thermoplastic polymer matrix during the hot melt compounding of the filled thermoplastic polymer. It is further believed that the reinforcing additive causes the formation of a strong and tough interphase between the individual filler particles and the surrounding matrix polymer, enabling the polymer to withstand the local stress concentrations caused by the filler particles, which might otherwise result in matrix crack initiation and catastrophic failure. It is believed that such increases in the toughness of the interphase enable the simultaneous achievement of high stress and ductility in the final composite. Filler treatments which rely solely on increased adhesion, i.e., coupling, between the filler surface and the matrix polymer, can increase the composite strength, but, if there is no improvement in interphase toughness, the composite will remain brittle. This concept is discussed in U.S. Pat. No. 4,385,136. The reinforcing additives include any organic compounds of the above description which do not contain any group or element adversely affecting the function of the polymer; filler; silane; or any other component of the composition. Suitable unsaturated organic compounds include ester diol 2,4-diacrylate, 1,4 butylene glycol diacrylate, diethylene glycol dimethacrylate, triallyl-s-triazine-2,4,6-(1H, 3H, 5H)-trione, triallyl mellitate, pentaerythritol triacrylate, polycaprolactone triacrylate, m-phenylene bis maleimide, dipentaerythritol pentaacrylate, melamine triacrylate, epoxidized linseed oil/acrylate, triacryloyl hexahydro-s-triazine, trimethylolpropane trimaleate, trimethacryloyl hexahydro-s-triazine, N,N-tetraacryloyl 1,6-diaminopyridine, 1,3-butylene glycol dimethacrylate, 1,3-butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bisalkyl glycol dicarbonate, triallyl cyanurate, acetyl triallyl citrate, divinyl benzene, dialkyl pthalate, tetraallyl methylenediamine, tetraallyl oxyethane, 3-methyl-1,4,6-heptatriene; 1-10-decamethylene glycol dimethacrylate and di-, tri-, tetra-, and pentaacrylates of poly(vinyl alcohol). In addition, the following low molecular weight polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, and partial alkyl esters of styrene-maleic anhydride oligomers.

It is preferred to employ polymerizable unsaturated organic compounds that have a high unsaturated level to molecular weight ratio. Therefore, the tri-, tetra-, and penta-acrylates of poly(vinyl alcohol) and the other tri-, tetra-, and penta-acrylates and methacrylates of polyols such as pentaerythritol, methylolpropane, and dipentaerythritol, as described above, are preferred.

The coupling agent and reinforcing additive are each used in amounts of about 0.05 part by weight to about 0.5 part by weight for each 100 parts by weight of copolymer. The effect can be maximized by the inclusion of suitable surfactants and free radical generators.

Examples of antioxidants are: hindered phenols such as tetrakis[methylene(3,5-di-tert-butyl-4-hydroxyhydrocinnamate)]methane and thiodiethylene bis(3,5-di-tert-butyl-4-hydroxy)hydrocinnamate; phosphites and phosphonites such as tris(2,4-di-tert-butylphenyl)-phosphite and di-tert-butylphenylphosphonite; various amines such as polymerized 2,2,4-trimethyl-1,2-dihydroquinoline; and silica. A tetrakis methane compound is preferred. Antioxidants are used in amounts of about 1 to about 5 parts by weight per hundred parts by weight of copolymer.

The patents mentioned in this specification are incorporated by reference herein.

The invention is illustrated by the following examples.

EXAMPLES 1 to 16

The magnesium hydroxide used in the examples is prepared as follows:

Five liters of an aqueous solution of magnesium chloride having a concentration of 1.5 moles per liter (the temperature of the solution is 15° C.) is placed in a reaction vessel having a capacity of about 10 liters, and the solution is stirred. An ammonia solution with a concentration of 10 moles per liter (the temperature of the solution is 15° C.) is added in an amount of 1.35 liters (corresponding to 0.9 equivalent of the magnesium chloride, i.e., per equivalent of magnesium chloride) over the course of about 10 minutes.

A part of the resulting suspension is immediately filtered at reduced pressure, and then washed thoroughly with water and then with acetone. The product is dried for about 2 hours at room temperature, and analyzed by X-ray diffraction and by a chemical analysis method. By the X-ray diffraction, the product is identified as basic magnesium chloride having the structure defined for the magnesium hydroxide. The chemical analysis shows that this product has the composition $Mg(OH)_{1.903} Cl_{10.097} mH_2O$. The presence of water of crystallization was confirmed by DTA and TGA. Immediately after the reaction, a greater portion of the remaining suspension is placed in a 20-liter autoclave, and hydrothermally treated at 180° C. for 8 hours. This heat treatment is carried out within about 2 hours after the end of the reaction because this unstable substance has to be treated while it remains undecomposed. After the hydrothermal treatment, the product is filtered at reduced pressure, washed with water and dried. The product obtained is identified as magnesium hydroxide by X-ray diffraction. It has a strain in the <101> direction of $0.970 \times 10^{-3}$, a crystallite size in the <101> direction of 4200 angstroms, and a specific surface area by the BET method of 6.7 square meters per gram.

DTA = differential thermal analysis
TGA = thermal gravimetric analysis
BET method = a nitrogen adsorption surface area measurement Sixteen compositions are processed into test specimens as required by the test procedure for Limiting Oxygen Index (LOI), i.e., ASTM-D 2863-70, and the test procedure is carried out. See, also, U.S. Pat. No. 4,446,279 issued May 1, 1984. Limiting Oxygen Index measures and quantifies flame resistance. The higher the LOI number the greater the flame resistance or flame retardance and the lower the emissions of smoke and other harmful gases. It is observed that no corrosive gases are present in the emissions; that the samples are self-extinguishing within a reasonable time; and that handling the samples provides no toxic effects on the skin.

Components in parts by weight, Limiting Oxygen Index (LOI), tensile strength, and elongation are given in the Table.

Examples 4, 10, 13 and 14 to 16 are examples using the composition of the invention.

Notes accompanying the Table:
EVA = copolymer of ethylene and vinyl acetate.
EVA I is based on 28 percent by weight vinyl acetate.
EVA II is based on 18 percent by weight vinyl acetate.
EEA = copolymer of ethylene and ethyl acrylate based on 35 percent by weight ethyl acrylate.
Polyethylene = a copolymer of ethylene and 1-butene having a density of 0.905 g/cc.
$Mg(OH)_2$ = magnesium hydroxide prepared as above. It is surface treated with about 2 parts by weight of stearic acid. Parts by weight of surface treating acid is based on 100 parts by weight of the metal hydrate.
Silicone fluid = vinyl modified polydimethylsiloxane having a specific gravity of 0.97@25/25° C. and a viscosity of 50,000 to 70,000 centistokes.
Antioxidant = pentaerythritol tetrakis (3,5-di-tert-butyl-4-hydroxyphenyl propionate).
Tensile strength (psi) is determined under
Elongation (%) is determined under ASTM D-412.

TABLE (Parts by Weight)

| | Examples | | | | | | | |
|---|---|---|---|---|---|---|---|---|
| | 1 | 2 | 3 | 4 | 5 | 6 | 7 | 8 |
| EVA I | 100 | — | — | 100 | — | — | 100 | — |
| EVA II | — | — | — | — | — | — | — | — |
| EEA | — | 100 | — | — | 100 | — | — | 100 |
| Polyethylene | — | — | 100 | — | — | 100 | — | — |
| Mg(OH)₂ | 100 | 100 | 100 | 100 | 100 | 100 | 100 | 100 |
| Silicone Fluid | — | — | — | 4.0 | 4.0 | 4.0 | — | — |
| Magnesium Stearate | — | — | — | — | — | — | 1.0 | 1.0 |
| Antioxidant | 0.4 | 0.4 | 0.4 | 0.4 | 0.4 | 0.4 | 0.4 | 0.4 |
| LOI | 32 | 27 | 27 | 56 | 28 | 30 | 32 | 27 |
| Tensile Strength (psi) | 1202 | 268 | 1285 | 1663 | 244 | 1181 | 1011 | 262 |
| Elongation (%) | 759 | 321 | 755 | 731 | 215 | 724 | 752 | 269 |

| | Examples | | | | | | | |
|---|---|---|---|---|---|---|---|---|
| | 9 | 10 | 11 | 12 | 13 | 14 | 15 | 16 |
| EVA I | — | 100 | — | — | — | 50 | 100 | 100 |
| EVA II | — | — | — | — | 100 | — | — | — |
| EEA | — | — | 100 | — | — | — | — | — |
| Polyethylene | 100 | — | — | 100 | — | 50 | — | — |
| Mg(OH)₂ | 100 | 100 | 100 | 100 | 100 | 100 | 150 | 100 |
| Silicone Fluid | — | 4.0 | 4.0 | 4.0 | 2.0 | 2.0 | 2.0 | 8.0 |
| Magnesium Stearate | 1.0 | 1.0 | 1.0 | 1.0 | — | — | — | — |
| Antioxidant | 0.4 | 0.4 | 0.4 | 0.4 | 0.4 | 0.4 | 0.4 | 0.4 |
| LOI | 27 | 57 | 29 | 32 | 51 | 47 | 65 | 56 |
| Tensile Strength (psi) | 1340 | 1742 | 237 | 1239 | 1388 | 1166 | 1039 | 1509 |
| Elongation (%) | 754 | 712 | 168 | 762 | 640 | 651 | 688 | 672 |

I claim:
1. A composition useful in the manufacture of cable comprising:
(i) a copolymer comprised of ethylene and vinyl acetate;
(ii) magnesium hydroxide having (a) a strain in the <101> direction of not more than $3.0 \times 10^{-3}$; (b) a crystallite size in the <101> direction of more than 800 angstroms; and (c) a surface area, determined by the BET method, of less than 20 square meters per gram, said magnesium hydroxide hav- ing been surface treated with one or more carboxylic acids having 8 to 24 carbon atoms or the metal salts thereof; and (iii) a silicone fluid.

2. The composition defined in claim 1 wherein the portion of the copolymer attributed to the vinyl acetate is in the range of about 12 to about 60 parts by weight based on 100 parts by weight of the copolymer.

3. The composition defined in claim 1 wherein the carboxylic acids and/or metal salts thereof are present in an amount of 0.1 to about 5 part by weight based on 100 parts by weight of magnesium hydroxide.

4. The composition defined in claim 1 wherein the silicone fluid has a viscosity in the range of about 1000 to about 1,000,000 centistokes.

5. The composition defined in claim 4 wherein the silicone fluid has a viscosity in the range of about 10,000 to about 1,000,000 centistokes.

6. The composition defined in claim 2 wherein the portion of the copolymer attributed to vinyl acetate is in the range of about 25 to about 52 parts by weight based on 100 parts by weight of copolymer.

7. The composition defined in claim 1 wherein the magnesium hydroxide is present in an amount of about 50 to about 350 parts by weight based on 100 parts by weight of the copolymer.

8. A composition useful in the manufacture of cable comprising:

(i) a copolymer comprised of ethylene and vinyl acetate wherein the portion of the copolymer attributed to the vinyl acetate is in the range of about 12 to about 60 parts by weight based on 100 parts by weight of the copolymer; and (ii) magnesium hydroxide having a surface area, as determined by the BET method, of less than 10 square meters per gram, the amount of magnesium hydroxide being in the range of about 50 to about 350 parts by weight based on 100 parts by weight of the copolymer, said magnesium hydroxide being surface treated with at least one carboxylic acid having 8 to 24 carbon atoms or a metal salt thereof in an amount of about 0.1 to about 5 parts by weight based on 100 parts by weight of the magnesium hydroxide; and (iii) a silicone fluid having a viscosity in the range of about 1,000 to about 1,000,000 centistokes.

9. An article of manufacture comprising a metal core conductor and at least one layer surrounding the core comprising the composition defined in claim 1.

10. An article of manufacture comprising a metal core conductor and at least one layer surrounding the core comprising the composition defined in claim 8.

11. The composition defined in claim 1 additionally containing a coupling agent.

12. The composition defined in claim 1 additionally containing a reinforcing additive.

* * * * *